(No Model.)
I. W. HEYSINGER.
MEAT TENDERER.
No. 260,393. Patented July 4, 1882.
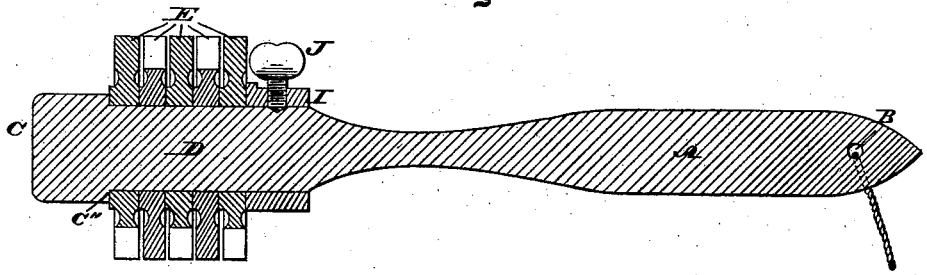
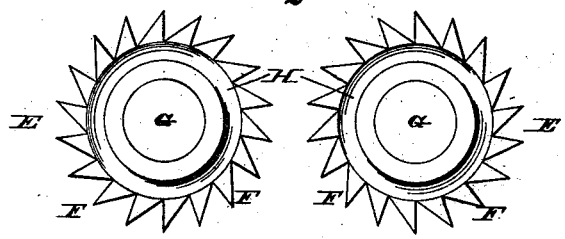
WITNESSES:
INVENTOR:
Isaac W. Heysinger
N. PETERS. Photo-Lithographer, Washington, D. C.

UNITED STATES PATENT OFFICE.

ISAAC W. HEYSINGER, OF PHILADELPHIA, PENNSYLVANIA.

MEAT-TENDERER.

SPECIFICATION forming part of Letters Patent No. 260,393, dated July 4, 1882.

Application filed November 10, 1881. (No model.)

*To all whom it may concern:*

Be it known that I, ISAAC W. HEYSINGER, of Philadelphia, county of Philadelphia, and State of Pennsylvania, have invented a certain Improvement in Tools for Tendering Beef-steaks and for other purposes, of which the following is a full, clear, and exact description, reference being had to the drawings accompanying and forming a part of this specification, in which—

Figure 1 is a longitudinal section, and Fig. 2 a front view, of two of the serrated disks removed from the handle.

My invention, which I call the "masticator," consists of a number of loosely-rotating toothed metallic disks, forming a segmental head, combined with a handle, the whole being so arranged that as the heavy metallic head is brought down upon a beefsteak or similar article the teeth, which I set at an incline, the slopes upon each alternate disk being set in an opposite direction, penetrate the fiber in the manner of chisels, so that the disks move upon each other and pull apart the different muscular strings, thus loosening up and disintegrating the structure, whereby a much more juicy and tender steak is produced than when the mass is crushed and bruised, as by ordinary pounders, or the juices allowed to escape, as in the case of employment of tenderers provided with fixed cutting-blades.

It is well known that the ultimate structure of muscular tissue consists of tubules containing the true meat-juices. When these are cut asunder or burst the juices are lost, the steak becoming dry and innutritious. By the use of my invention these fibers are pulled apart, the operation being similar to that of "picking" the tissue to pieces by means of separate pointed instruments, the integrity of each sarcode being preserved for the subsequent action of the heat in cooking.

In the drawings, A represents a handle, preferably of wood. It is provided with a cylindrical part, D, and an enlarged head, C, having a shoulder, C'', to prevent the escape of the disks therefrom. These disks E E E E E, of which I use a number for each tool, varying from four to six, or more, are toothed around their peripheries, as shown at F F. I make these teeth pointed enough to easily penetrate the fiber, as the action is not that of crushing, but of tearing apart by the thrust of the chisel-pointed teeth, as above described. A simple pointed tooth with both bevels alike will answer in a measurable degree; but its action is slower and more uncertain. I also sometimes use for certain purposes a plain circular disk, the circumference of which is beveled to an edge, the pulling apart in such cases being upon a line parallel with the handle instead of transverse to it. I also sometimes alternate these forms and use them in various combinations; but I prefer the simple saw-toothed disks, the teeth sloped, as shown in Fig. 2, and ordinarily use this form. The movable disks, as shown in Fig. 2, are provided at their centers with a cylindrical hub arranged to encircle and fit loosely upon the cylindrical portion D of the handle A and rotate freely thereupon. Of course any other form of handle which will admit of the employment of my loose disks in the manner proposed may be used; but the form shown is believed to be the cheapest and most effective construction possible. The disks beyond the border of the hub are thinned sufficiently to prevent their contact with each other while rotating upon the handle. As before stated, the disks are placed upon the handle with the slopes of their teeth reversed up-on each alternate one, so that as the head of the tool is driven into the meat the slope of the teeth will slightly rotate each disk in an opposite direction to that of its neighbor, the teeth meanwhile holding onto and pulling the fibers of the meat asunder. This may be readily demonstrated by pushing a pencil or similar long and smooth object against the teeth, which will thus gradually make a complete rotation, passing each other in opposite directions.

To hold the various parts snugly together, I provide the metal collar I, which is brought up over the handle against the series of disks, and then tightened upon the said handle by means of the thumb-screw J, whereby the tool may be instantly taken apart for cleaning, or a greater or less number of disks (and consequent weight of head) may be used.

In addition to its special utility, this tool may be very easily and cheaply made, the separate disks being cast without difficulty, whereas it would be well-nigh impossible to cast a fixed head with so many divergent points, even if it were desirable to do so. The disks may be used either plain or polished, and may be tinned or galvanized, if desired.

Having now described my invention, what I claim as new, and desire to secure by Letters Patent, is—

In a steak-tenderer, the series of freely-rotating disks E E, provided with inclined teeth, each alternate disk having the slope of the teeth in an opposite direction, in combination with a handle for manipulating the same, substantially as described.

ISAAC W. HEYSINGER.

Witnesses:
JOHN A. WIEDERSHEIM,
F. COOPER.